United States Patent Office 2,824,087

Patented Feb. 18, 1958

2,824,087

LIGHT-SENSITIVE RHODANINE ESTERS OF MALEIC ANHYDRIDE COPOLYMERS

John J. Sagura and Cornelius C. Unruh, Rochester, N. Y., assignors to Eastman Kodak Company, Rochester, N. Y., a corporation of New Jersey No Drawing. Application August 16, 1956
Serial No. 604,342

14 Claims. (Cl. 260—78.5)

This invention relates to light-sensitive rhodanine compounds, and more particularly to light-sensitive resinous ester polymers obtained by the reaction of maleic anhydride copolymers with the hydroxyalkyl derivatives of such rhodanine compounds.

Although a number of light-sensitive materials have been prepared and described heretofore, most of these products are generally sensitive to light in the ultraviolet portion of the electromagnetic spectrum. Some have found utility in various photomechanical reproduction processes where the invisible image obtained is either not detrimental (although desirable) or the image obtained must be treated with a dye solution to render it visible. It would be of considerable advantage to have a polymeric light-sensitive material which would be capable of producing a visible image without the necessity of using a dye bath, and which would be sensitive to the visible portion of the spectrum so that ordinary light sources could be used for exposure purposes.

We have now found that highly colored polymers that are sensitive to visible light may be prepared by reacting certain 3-ω-hydroxyalkyl-5-substituted rhodanines with polymers containing maleic anhydride groups, that these products are soluble and may be coated from their solutions on suitable substrates, for example, on sheets of cellulose esters, polyesters, glass, metal, etc., that the polymer coatings on such coated materials on exposure through a negative become insoluble in the exposed areas, and that on development in a solvent that removes the soluble unexposed polymer they give positive, highly colored images. Such exposed and developed elements can be effectively used in preparing lithographic or printing plates for reproduction purposes.

Actually, our new class of resinous polymers may be considered to be light-sensitive polymeric dyes. We have found certain N-hydroxyalkyl rhodanines to be particularly effective intermediates for the preparation of these polymers, because the methylene group in the 5-position of the heterocyclic nucleus is capable of undergoing a number of different condensations, particularly with certain aromatic and heterocyclic aldehydes to give a variety of highly colored intermediates that can be reacted with polymers containing carboxylic anhydride or carboxylic chloride groups.

It is, accordingly, an object of the invention to provide a new class of resinous polymers. A further object is to provide highly colored compositions which become insolubilized on exposure to visible light, and which are particularly useful for photomechanical reproduction processes. Another object is to provide a process for preparing the new class of polymers. Other objects will become apparent from the description and examples.

In accordance with our invention, we prepare our new class of light-sensitive resinous polymers, which are essentially binary copolymers of from ⅓ to 1 mole of maleic anyhydride to each mole of a polymerizable monomer represented by the general formula:

(1)

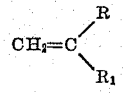

wherein R represents an atom of hydrogen or a methyl group and $R_1$ represents an atom of hydrogen, a halogen atom such as chlorine or bromine, a phenyl group, a naphthyl group, a pyridyl group, a cyano group, a carboxyl group, a carbamyl group, the groups $—OCOR_2$, $—COOR_2$, $—OR_2$, $—CONHR_2$, etc. wherein $R_2$ represents an alkyl group of from 1 to 4 carbon atoms, and having at least 30% and up to substantially 100% of the maleic anhydride groups therein converted to esters represented by the following structural unit:

(2)

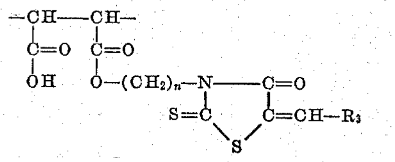

wherein $n$ represents a whole number of from 2 to 4 i. e. $(CH_2)_n$ represents an ethylene, propylene or butylene group and $R_3$ represents a phenyl group (3)

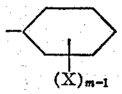

wherein $m$ represents a whole number of from 2 to 3 and X represents an atom of hydrogen, a hydroxyl group, an alkyl group of from 1 to 4 carbon atoms, an alkoxy group ($—OR_2$ wherein $R_2$ is as above defined) of from 1 to 4 carbon atoms, a dioxymethylene group ($—OCH_2O—$), a nitro group, an acetamino group and the group $—NR_2R_2$ wherein $R_2$ has the above meaning, and the like, a naphthyl or anthryl group, or a heterocyclic group such as a furyl group, a β-furylvinyl group, a C-pyridyl group, etc., by first preparing the binary copolymers of maleic anhydride by conventional polymerization methods, for example, by heating, exposing to actinic light or use of polymerization catalysts such as benzoyl peroxide, potassium persulfate, etc., or combinations of these polymerization accelerators, in mass, in solution or suspensions in non-solvents, a mixture of maleic anyhydride and the selected comonomer. The copolymers are then reacted with the selected 3-($\omega$-hydroxyalkyl)-5-substituted rhodanine to obtain the corresponding light-sensitive and colored resinous polymers of the invention. Preferably the above esterification reaction is carried out in an inert solvent medium such as a tertiary organic amine represented by pyridine, dimethylformamide, and the like, at temperatures up to the refluxing temperature of the reaction mixture, but preferably from about 30° to 120° C. The proportions of the 3-($\omega$-hydroxyalkyl)-5-substituted rhodanine intermediate employed can vary from about 0.3 to 2 molar equivalents of the maleic anhydride in the copolymer. Where less than a molar equivalent of the rhodanine compound is employed, the final esterified product will contain some residual unesterified maleic acid or maleic anhydride groups. Those of our light-sensitive resinous polymers prepared with 3-(2-hydroxyethyl)-5-(4-methoxybenzylidene)-rhodanine and styrene-maleic anhydride copolymers, and more particularly the fully esterified 1:1 copolymers, are outstanding in their light-sensitive and other properties and are the preferred species.

Typical polymerizable monomers represented by above structure (1) include the monoethylenically unsaturated and polymerizable compounds containing the $CH_2=C<$ group such as ethylene, isobutylene, vinyl carboxylic esters such as vinyl acetate, vinyl butyrate, vinyl benzoate, vinyl halides such as vinyl chloride, vinyl fluoride, vinylidene dichloride, etc., alkyl esters, amides, N-alkyl substituted amides or nitriles of acrylic or methacrylic acids such as methyl acrylate, ethyl acrylate, methyl methacrylate, acrylamide, methacrylamide, N-methyl acrylamide, N,N-dimethyl acrylamide, N-methyl methacrylamide, acrylonitrile, methacrylonitrile, vinyl alkyl ethers such as vinyl methyl ether, vinyl ethyl ether, etc., styrenes such as styrene, alpha-methylstyrene, vinyl toluene such as p-methylstyrene, p-acetaminostyrene, vinyl naphthalenes, C-vinyl pyridines, etc.

The intermediate light-sensitive rhodanine compounds employed in the esterification of the maleic anhydride copolymers may be prepared by reacting a 3-$\omega$-hydroxyalkyl rhodanine with a benzaldehyde represented by the general formula:

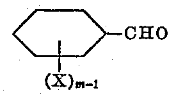

wherein $m$ and X have the previously defined meanings, for example, nitrobenzaldehyde, benzaldehyde, monoalkyl substituted benzaldehydes such as o-tolualdehyde, m-tolualdehyde, p-tolualdehyde and corresponding ethyl-, propyl- and butyl-benzaldehydes, dialkyl substituted benzaldehydes such as 2,5-dimethylbenzaldehyde, 3,5-dimethylbenzaldehyde, 2,6-dimethylbenzaldehyde, etc. and corresponding diethyl-, dipropyl- and dibutyl-benzaldehydes, monoalkoxy substituted benzaldehydes such as o-methoxybenzaldehyde, p-methoxybenzaldehyde and corresponding ethoxy-, propoxy- and butoxy-benzaldehydes, dialkoxy substituted benzaldehydes such as 3,4-dimethoxybenzaldehyde, 2,5-dimethoxybenzaldehyde, etc. and corresponding diethoxy-, dipropoxy- and dibutoxy-benzaldehydes, vanillin, isovanillin, piperonal, acetaminobenzaldehydes such as p-acetaminobenzaldehyde, aminobenzaldehydes such as p-dimethylaminobenzaldehyde, p-diethylaminobenzaldehyde, monochlorobenzaldehydes such as o- or p-chlorobenzaldehyde, dichlorobenzaldehydes such as 2,4- or 3,4-dichlorobenzaldehyde, sulfo-benzaldehydes such as benzaldehyde-o-sulphonic acid or benzaldehyde-m-sulphonic acid, etc., or reacted with a naphthaldehyde or an anthraldehyde, or reacted with heterocyclic aldehydes such as furfural, thenaldehyde 2-furaneacrolein, 2-pyridinecarboxaldehyde, etc., to give the corresponding 3-($\omega$-hydroxyalkyl)-5-substituted rhodanine intermediates of the invention represented by the following general formula:

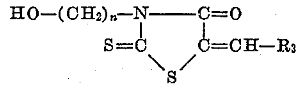

wherein $n$ and $R_3$ have the previously defined meanings.

The following examples will serve to illustrate more fully the manner whereby we practice our invention.

EXAMPLE 1.—PREPARATION OF N-2-HYDROXYETHYL RHODANINE

To a cold solution of 140 g. of ethanolamine in 250 cc. of ethanol, there was slowly added a solution of 60 cc. of carbon disulfide in 200 cc. of diethyl ether. The mixture was kept cold for 2–3 hours and then allowed to stand at room temperature overnight. The mixture had separated into two layers; a nearly colorless, clear top layer and a dark green oil bottom layer. The green oil layer was separated and cooled in an ice water bath, and while stirring vigorously, there was added slowly over a period of 15 minutes a cold solution of 88 g. of sodium chloroacetate dissolved in 150 cc. of water. The resulting solution was allowed to stand 30 minutes, and then added slowly to 400 cc. of stirred and boiling 6-normal hydrochloric acid, during which time the mixture was kept boiling. A yellow, clear solution formed which on cooling precipitated an oil.

The mixture was cooled and the aqueous layer was extracted with chloroform. The oil and the chloroform extract were combined and extracted with a little ice-water, dried over anhydrous sodium sulfate and evaporated down to a heavy amber oil weighing 103 g. Analysis of this product showed it to be N-2-hydroxyethyl rhodanine containing very little impurities so that it was possible to use it without further purification in the condensation reaction with any of the mentioned aldehydes.

In place of the ethanolamine in the above example, there may be substituted an equivalent amount of propanolamine or of butanolamine to obtain the corresponding N-$\omega$-hydroxyalkyl rhodanines represented by N-3-hydroxypropyl rhodanine and N-4-hydroxy-n-butyl rhodanine.

EXAMPLES 2–11.—PREPARATION OF CONDENSATION PRODUCTS OF ALDEHYDES AND N-2-HYDROXYETHYL RHODANINE

In each example, equimolar amounts by weight of N-2-hydroxyethyl rhodanine [3-(2-hydroxyethyl)-rhodanine] and an aromatic or heterocyclic aldehyde selected from the group of previously mentioned suitable aldehydes were boiled under reflex for a period of from 30 minutes to 5 hours with catalytic amounts of piperidine or triethylamine. The reaction products either crystallized from the reaction mixtures or were isolated by evaporation of the solvent or by precipitation on dilution of the reaction mixture with water. Recrystallizations were effected from benzene, ethanol, glacial acetic acid, methyl cellosolve or dimethylformamide. The conditions and results for each example are summarized in the following Table I. The letters C, H, N and S stand for carbon, hydrogen, nitrogen and sulfur, respectively.

*Table I*

| Ex. No. | Name and Formula | Crystal | | Crystal | | Reaction Data | | |
|---|---|---|---|---|---|---|---|---|
| | | Color | M. P., °C. | Analysis, Percent by wgt. Calc'd. | Analysis, Percent by wgt. Found | Aldehyde | Catalyst | Time, Hrs. |
| 2 | 3-(2-Hydroxyethyl)-5-(4-dimethylaminobenzylidene)-rhodanine 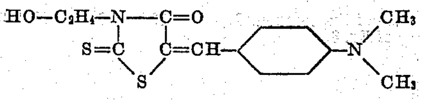 | Red-violet. | 125–125 | N, 9.0<br>S, 20.8 | N, 9.0<br>S, 20.4 | p-Dimethylamino benzaldehyde. | Piperidine | 1 |
| 3 | 3-(2-Hydroxyethyl)-5-(4-methoxybenzylidene)-rhodanine 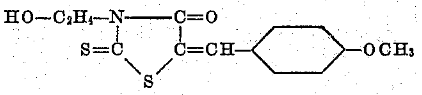 | Yellow | 162–163 | C, 52.8<br>H, 4.4<br>N, 4.7<br>S, 21.7 | C, 52.8<br>H, 4.5<br>N, 4.6<br>S, 21.5 | Anisaldehyde | do | 1 |
| 4 | 3-(2-Hydroxyethyl)-5-(benzylidene)-rhodanine 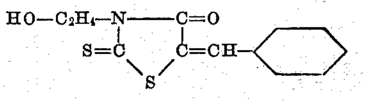 | do | 129–130 | C, 54.3<br>H, 4.2<br>N, 5.3<br>S, 24.2 | C, 54.7<br>H, 4.6<br>N, 5.7<br>S, 23.8 | Benzaldehyde | do | 1 |
| 5 | 3-(2-Hydroxyethyl)-5-piperonilidene)-rhodanine 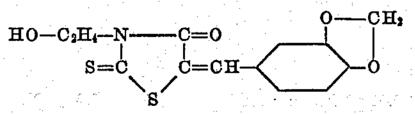 | Orange | 162–163 | C, 50.5<br>H, 3.6<br>N, 4.5<br>S, 20.7 | C, 50.8<br>H, 3.8<br>N, 4.5<br>S, 20.6 | Piperonal | Piperideine | 3 |
| 6 | 3-(2-Hydroxyethyl)-5-(4-Nitrobenzylidene)-rhodanine 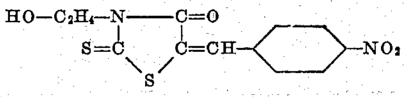 | Yellow | 204–205 | C, 46.4<br>H, 3.6<br>N, 4.5<br>S, 20.7 | C, 46.8<br>H, 3.8<br>N, 4.5<br>S, 20.6 | p-Nitrobenzaldehyde. | Piperidine | 1 |
| 7 | 3-(2-Hydroxyethyl)-5-(4-acetamidobenzylidene)-rhodanine 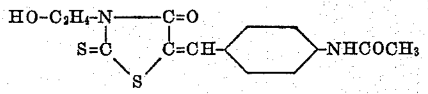 | do | 239–240 | C, 52.1<br>H, 4.4<br>N, 8.7<br>S, 19.9 | C, 52.2<br>H, 4.4<br>N, 8.8<br>S, 20.0 | p-Acetaminobenzaldehyde. | do | 0.75 |
| 8 | 3-(2-Hydroxyethyl-5-(4-hydroxy-3-methoxybenzylidene)-rhodanine 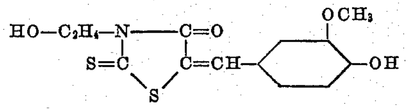 | do | 224–225 | C, 50.1<br>H, 4.2<br>N, 4.5<br>S, 20.6 | C, 50.5<br>H, 4.6<br>N, 4.5<br>S, 20.3 | Vanillin | do | 1 |
| 9 | 3-(2-Hydroxyethyl)-5-furfurylidene)-rhodanine 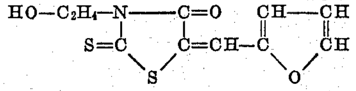 | do | 158–159 | C, 47.0<br>H, 3.5<br>N, 5.5<br>S, 25.1 | C, 47.1<br>H, 3.5<br>N, 5.6<br>S, 25.3 | Furfural | Piperidine | 0.5 |
| 10 | 3-(2-Hydroxyethyl)-5-(2-methoxybenzylidene)-rhodanine 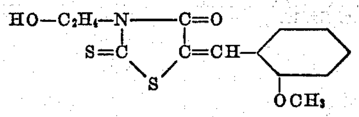 | do | 145–146 | | | o-Methoxybenzaldehyde. | Triethylamine. | 5 |
| 11 | 3-(2-Hydroxyethyl)-5-(2-pyridylidene)-rhodanine 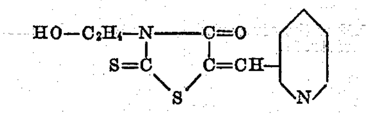 | do | 177–178 | | | 2-Pyridine carboxaldehyde. | Piperidine | 1 |

*Table II*

| Ex. No. | Polymer Contains the Recurring Group— | Reaction Data: Reactants, Gram Moles: Copolymer | Reaction Data: Reactants, Gram Moles: Rhodanine | Reaction Data: Pyridine, cc. | Reaction Data: Time, Hrs. | Analysis, percent by wgt.: Calc'd. | Analysis, percent by wgt.: Found |
|---|---|---|---|---|---|---|---|
| 12 | 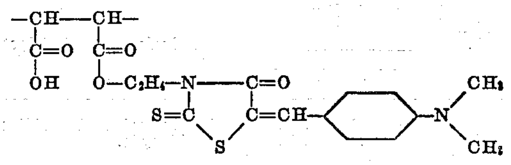 | 0.03 | 0.03 of the compound of Ex. 2. | 60 | 4 | N, 5.5 | N, 2.3 |
| 13 | 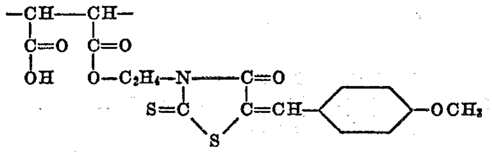 | 0.15 | 0.10 of the compound of Ex. 3. | 80 | 5 | N, 2.3 | N, 2.5 |
| 14 | 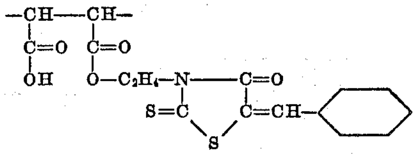 | 0.03 | 0.02 of the compound of Ex. 4. | 60 | 2.5 | N, 2.4 | N, 2.5 |
| 15 | 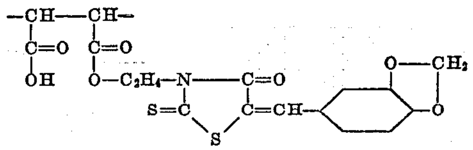 | 0.03 | 0.03 of the compound of Ex. 5. | 60 | 5 | N, 2.7 | N, 3.5 |
| 16 | 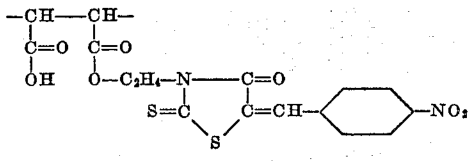 | 0.03 | 0.02 of the compound of Ex. 6. | 60 | 2.5 | N, 4.4 | N, 4.8 |
| 17 | 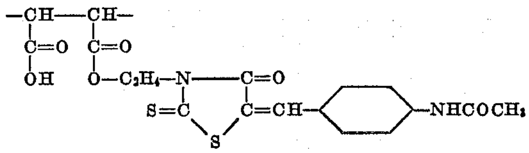 | 0.015 | 0.01 of the compound of Ex. 7. | 50 | 4 | -------- | -------- |
| 18 | 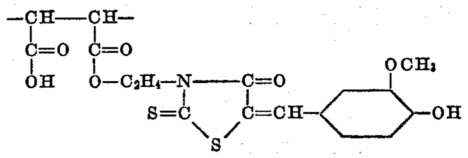 | 0.03 | 0.02 of the compound of Ex. 8. | 60 | 2.5 | -------- | -------- |
| 19 | 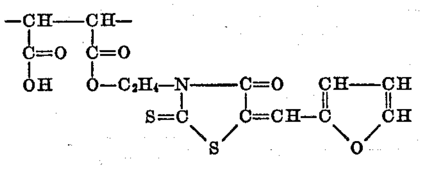 | 0.03 | 0.02 of the compound of Ex. 9. | 70 | 4 | -------- | -------- |
| 20 | 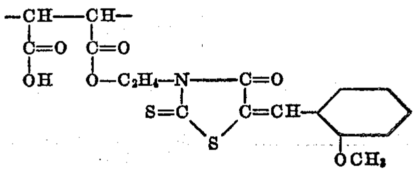 | 0.03 | 0.02 of the compound of Ex. 10. | 70 | 4 | -------- | -------- |
| 21 | 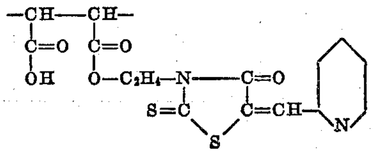 | 0.03 | 0.02 of the compound of Ex. 11. | 70 | 4 | -------- | -------- |

While the examples in Table I illustrate intermediate compounds obtained with N-2-hydroxyethyl rhodanine, it will be understood that N-3-hydroxypropyl rhodanine or N-4-hydroxy-n-butyl rhodanine can also be substituted therefor to give the corresponding intermediates.

EXAMPLES 12–21.—PREPARATION OF LIGHT-SENSITIVE RESINOUS ESTERS

These examples illustrate the light-sensitive products obtained by the condensation of a styrene-maleic anhydride copolymer with the rhodanine intermediates prepared in accordance with the above Examples 2–11.

In each example a pyridine solution of a 1:1 styrene-maleic anhydride copolymer (containing approximately equimolar proportions of styrene and maleic anhydride and the rhodanine intermediate was heated at 80° C. for a period of from 2.5 to 5 hours. The resulting viscous solution was diluted with 1–2 volumes of acetone and poured in a slow stream into 10–15 volumes of vigorously agitated distilled water containing sufficient acetic acid to neutralize the pyridine. The resin precipitated and was collected, washed thoroughly with distilled water, and dried in vacuo at 40° C. The equivalent amounts of reactants employed were varied in order to obtain a resin with the desired solubility characteristics. The conditions of reaction and the structure of the light-sensitive portion of the linear carbon chain of the resulting polymer are shown for each of the examples in Table II, while the light-sensitivity data for coated examples thereof are shown in Table III. It will be understood that the remaining portions of the polymer chain are units of styrene or units of unreacted copolymer, depending on the proportions of the reactants.

EXAMPLES 22–31.—PREPARATION OF COATINGS AND RELATIVE SENSITIVITIES THEREOF

These examples illustrate the properties of materials coated with the polymers obtained in accordance with the above Examples 12–21.

In each example, the coatings of uniform thickness were made on a paper base. To determine the sensitivity of the coated paper examples, each example was divided into two strips, one of which was exposed beneath a density step wedge through a ¼-inch of clear, colorless glass and the other of which was similarly exposed through a ¼-inch Plexiglas (polymethyl methacrylate sheet). The exposed strips were then developed in a solvent which left in each instance insolubilized polymer (forming the image) in proportion to the degree of exposure. The images had the colors indicated in Table I. However, for testing purposes, the images were dyed and inked by a standard procedure and the densities of the step wedge producing the last visible insolublized image were read and the relative speed calculated. The overall sensitivities are shown in terms of a speed factor as compared with a value of 1.0 for unsensitized polyvinyl cinnamate check strips, coated, exposed and developed simultaneously under exactly the same conditions in an appropriate organic solvent. The results are shown in the following Table III.

*Table III*

| Example No. | Coating Material | Coating and Developing Solvent | Speed Factor | |
|---|---|---|---|---|
| | | | Glass | Plexiglas |
| 22 | Polymer of Ex. 12 | Dimethylformamide | 180 | 2.8 |
| 23 | Polymer of Ex. 13 | Cyclohexanone | 1,600 | 28 |
| 24 | Polymer of Ex. 14 | do | 200 | 3.5 |
| 25 | Polymer of Ex. 15 | {Cyclohexanone | 180 | 3.5 |
| | | {Dimethylformamide | 180 | 3.2 |
| 26 | Polymer of Ex. 16 | Cyclohexanone | 130 | 2.2 |
| 27 | Polymer of Ex. 17 | Dimethylformamide | 130 | 3.5 |
| 28 | Polymer of Ex. 18 | Cyclohexanone | 320 | 5.0 |
| 29 | Polymer of Ex. 19 | Dimethylformamide | 250 | 7.0 |
| 30 | Polymer of Ex. 20 | Cyclohexanone | 400 | 8.0 |
| 31 | Polymer of Ex. 21 | do | 900 | 18 |

The data in the above Table III indicate a considerable improvement in speed for materials coated with our new light-sensitive polymers as compared with the prior art as represented by unsensitized polyvinyl cinnamate coated photographic materials. It will be noted further that Example 23, which is coated with the polymers of Example 13 i. e. with polymers containing units of maleic acid monoester of 3-(2-hydroxyethyl)-5-(4-methoxybenzylidene)-rhodanine, is outstanding in showing a speed factor through glass of 1600, and that other species all show a speed factor of 130 or more.

EXAMPLE 32

This example illustrates an alternative, but less preferable method of preparing some of the light-sensitive polymers of our invention.

A solution of 2.44 g. (0.02 mol.) 2-furaneacrolein, 3.54 g. (0.02 mol.) of N-2-hydroxyethyl rhodanine, 1.7 g. of piperidine and 6.0 g. (0.03 mol.) of a 1:1 mole ratio copolymer of styrene and maleic anhydride in 60 cc. of dimethylformamide was heated at 80° C. for 2 hours. The resulting viscous solution was diluted with an equal volume of acetone and poured in a slow stream into 2 liters of vigorously agitated water containing 10 cc. of glacial acetic acid to precipitate the polymer product. The resin was collected and purified by repeated solution in dimethylformamide and reprecipitation in diethyl ether. Analysis indicated that the polymeric product was essentially a styrenemaleic anhydride copolymer ester of 5-[2-(furfurylidene)-ethylidene] - 3 - (2-hydroxyethyl)-rhodanine characterized by containing the recurring structural unit:

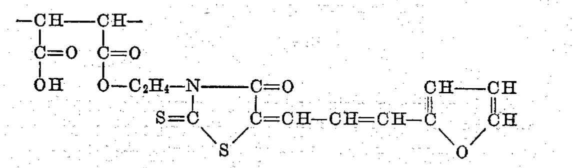

the remainder of the polymer being a minor proportion of styrene units and unreacted original copolymer units.

A coating made on a paper base from a solution of the purified resin in dimethylformamide, was exposed through a line negative and developed in the same solvent to give an orange colored image. It showed a speed factor of 400 through glass and 7.0 through Plexiglas.

By proceeding as set forth in the above examples still other species of light-sensitive polymers coming within the scope of our invention can be prepared. For example, instead of employing the intermediate 3-(2-hydroxyethyl)rhodanine, there can be used the mentioned 3-(3-hydroxypropyl)- or the 3-(4-hydroxy-n-butyl)-rhodanines to give with the mentioned aldehydes, followed by subsequent condensation with the maleic anhydride, generally similar light-sensitive polymeric materials. Also, mixtures of the rhodanine-aldehyde condensation products can be reacted with the mentioned maleic anhydride copolymers to give other valuable light-sensitive polymeric products. All of these are soluble in one or more organic solvents such as cyclohexanone, dimethylformamide, etc., but become insoluble in these solvents on exposure to ultraviolet or visible light so that they are also adapted for the preparing of materials useful in the photomechanical reproduction art.

It is also within the scope of the invention to employ in place of the maleic anhydride copolymers other polymers and copolymers of related $\alpha,\beta$-unsaturated mono and dibasic carboxylic acid anhydrides, for example, polyacrylic and polymethacrylic anhydrides, copolymers of citraconic and itaconic anhydrides, and the like.

What we claim is:

1. A resinous styrene-maleic anhydride copolymer of from ⅓ to 1 mole of maleic anhydride to each mole of styrene and having at least 30% of the maleic anhydride groups converted to ester groups represented by the following general formula:

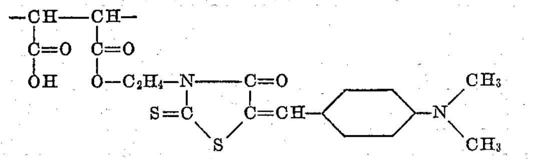

2. A resinous styrene-maleic anhydride copolymer of from ⅓ to 1 mole of maleic anhydride to each mole of styrene and having at least 30% of the maleic anhydride groups converted to ester groups represented by the following general formula:

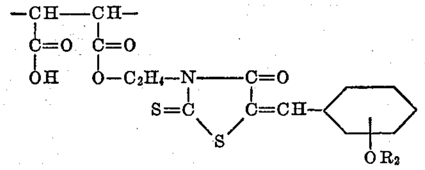

wherein $R_2$ represents an alkyl group of from 1 to 4 carbon atoms.

3. A resinous styrene-maleic anhydride copolymer of from ⅓ to 1 mole of maleic anhydride to each mole of styrene and having at least 30% of the maleic anhydride groups converted to ester groups represented by the following general formula:

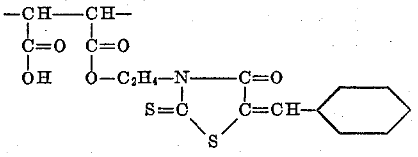

4. A resinous styrene-maleic anhydride copolymer of from ⅓ to 1 mole of maleic anhydride to each mole of styrene and having at least 30% of the maleic anhydride groups converted to ester groups represented by the following general formula:

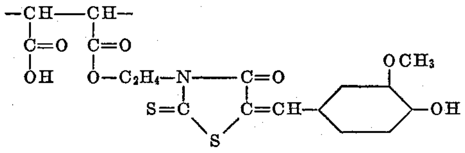

5. A resinous styrene-maleic anhydride copolymer of from ⅓ to 1 mole of maleic anhydride to each mole of styrene and having at least 30% of the maleic anhydride groups converted to ester groups represented by the following general formula:

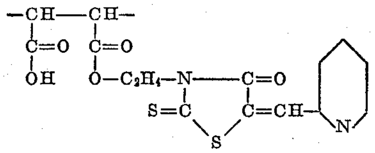

6. A resinous styrene-maleic anhydride copolymer of from ⅓ to 1 mole of maleic anhydride to each mole of styrene and having at least 30% of the maleic anhydride groups converted to ester groups represented by the following general formula:

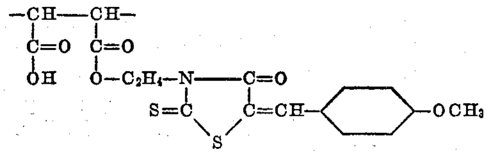

7. A process for preparing a resinous styrene-maleic anhydride copolymer having at least 30% of the maleic anhydride groups converted to ester groups, which comprises heating a pyridine solution of a styrene-maleic anhydride copolymer of from ⅓ to 1 mole of maleic anhydride to each mole of styrene with from 0.3 to 2 molecular equivalents, based on the moles of the maleic anhydride copolymer, of 3-(2-hydroxyethyl)-5-(4-dimethylaminobenzylidene)-rhodanine.

8. A process for preparing a resinous styrene-maleic anhydride copolymer having at least 30% of the maleic anhydride groups converted to ester groups, which comprises heating a pyridine solution of a styrene-maleic anhydride copolymer of from ⅓ to 1 mole of maleic anhydride to each mole of styrene with from 0.3 to 2 molecular equivalents, based on the moles of the maleic anhydride copolymer, of a rhodanine compound represented by the following general formula:

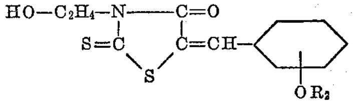

wherein $R_2$ represents an alkyl group of from 1 to 4 carbon atoms.

9. A process for preparing a resinous styrene-maleic anhydride copolymer having at least 30% of the maleic anhydride groups converted to ester groups, which comprises heating a pyridine solution of a styrene-maleic anhydride copolymer of from ⅓ to 1 mole of maleic anhydride to each mole of styrene with from 0.3 to 2 molecular equivalents, based on the moles of the maleic anhydride copolymer, of 3-(2-hydroxyethyl)-5-(benzylidene)-rhodanine.

10. A process for preparing a resinous styrene-maleic anhydride copolymer having at least 30% of the maleic anhydride groups converted to ester groups, which comprises heating a pyridine solution of a styrene-maleic anhydride copolymer of from ⅓ to 1 mole of maleic anhydride to each mole of styrene with from 0.3 to 2 molecular equivalents, based on the moles of the maleic anhydride copolymer of 3-(2-hydroxyethyl)-5-(4-hydroxy-3-methoxybenzylidene)-rhodanine.

11. A process for preparing a resinous styrene-maleic anhydride copolymer having at least 30% of the maleic anhydride groups converted to ester groups, which comprises heating a pyridine solution of a styrene-maleic anhydride copolymer of from ⅓ to 1 mole of maleic anhydride to each mole of styrene with from 0.3 to 2 molecular equivalents, based on the moles of the maleic anhydride copolymer, of 3-(2-hydroxyethyl)-5-(2-pyridylamine)-rhodanine.

12. A process for preparing a resinous styrene-maleic anhydride copolymer having at least 30% of the maleic anhydride groups converted to ester groups, which comprises heating a pyridine solution of a styrene-maleic anhydride copolymer of from ⅓ to 1 mole of maleic anhydride to each mole of styrene with from 0.3 to 2 molecular equivalents, based on the moles of the maleic anhydride copolymer, of 3-(2-hydroxyethyl)-5-(4-methoxybenzylidene)-rhodanine.

13. A resinous styrene-maleic anhydride copolymer of from ⅓ to 1 mole of maleic anhydride to each mole of styrene and having at least 30% of the maleic anhydride groups converted to ester groups represented by the following general formula:

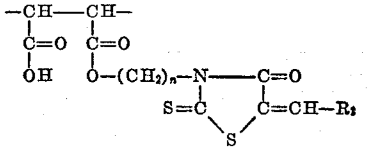

wherein $n$ represents a whole number of from 2 to 4 and $R_3$ represents a member selected from the group consisting of a phenyl group, a nitrophenyl group, a 3,4-methylenedioxyphenyl group, an acetaminophenyl group, an alkoxyphenyl group wherein the alkoxy group contains from 1 to 4 carbon atoms, a dialkylaminophenyl group wherein each alkyl group contains from 1 to 4 carbon atoms, a hydroxyanisyl group, a C-pyridyl group and the furyl group

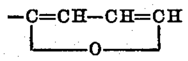

14. A process for preparing a resinous styrene-maleic anhydride copolymer of ⅓ to 1 mole of maleic anhydride to each mole of styrene and having at least 30% of the maleic anhydride groups converted to ester groups represented by the following general formula:

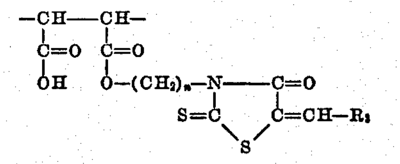

wherein *n* represents a whole number of from 2 to 4 and $R_3$ represents a member selected from the group consisting of a phenyl group, a nitrophenyl group, a 3,4-methylenedioxyphenyl group, an acetaminophenyl group, an alkoxyphenyl group wherein the alkoxy group contains from 1 to 4 carbon atoms, a dialkylaminophenyl group wherein each alkyl group contains from 1 to 4 carbon atoms, a hydroxyanisyl group, a C-pyridyl group and the furyl group

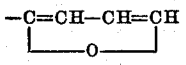

which comprises heating a tertiary amine solution of a styrene-maleic anhydride copolymer of ⅓ to 1 mole of maleic anhydride to each mole of styrene with 0.3 to 2.0 molecular equivalents, based on the moles of the said styrene-maleic anhydride copolymer, of a rhodanine compound represented by the following general formula:

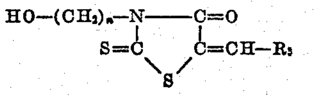

wherein *n* and $R_3$ are as above defined.

No references cited.